United States Patent [19]

Omae et al.

[11] 4,144,992
[45] Mar. 20, 1979

[54] METHOD FOR CONTROLLING AN AUTOMATIC PIPE WELDER

[75] Inventors: Tsutomu Omae; Takanori Shibata; Keiziro Sakai, all of Hitachi; Tomio Iizuka, Ibaraki; Takaichi Koyama, Hitachi, all of Japan

[73] Assignee: Hitachi, Ltd., Japan

[21] Appl. No.: 829,891

[22] Filed: Sep. 1, 1977

[30] Foreign Application Priority Data

Sep. 3, 1976 [JP]  Japan ............................... 51-104872

[51] Int. Cl.² ............................................. B23K 9/10
[52] U.S. Cl. ..................................... 228/102; 228/29; 219/60 A; 219/125.11
[58] Field of Search ........................ 228/8, 9, 29, 102; 219/60 A, 124.34, 125.11

[56] References Cited

U.S. PATENT DOCUMENTS

| 2,288,433 | 6/1942 | Boetcher et al. | 228/225 X |
| 2,894,111 | 7/1959 | McNutt | 228/60 A |
| 3,266,700 | 8/1966 | Bauer et al. | 228/29 X |
| 3,266,701 | 8/1966 | Peignen | 228/29 X |
| 3,373,914 | 3/1968 | Wall | 228/8 |
| 3,924,094 | 12/1975 | Crayton et al. | 228/124.34 |
| 4,019,016 | 4/1977 | Friedman et al. | 219/60 A X |

Primary Examiner—Al Lawrence Smith
Assistant Examiner—K. J. Ramsey
Attorney, Agent, or Firm—Craig & Antonelli

[57] ABSTRACT

Method for controlling an automatic pipe welder is disclosed. In the automatic welder which requires remote control, welding conditions for butt welding pipes are stored and an actual joint geometry or groove shape is sensed. From signals relating to the stored welding conditions and the sensed groove shape, a control command signal in actual welding is produced to effect welding under an optimum condition. On the other hand, an arc condition at an actual welding point and a melting condition of a metal are monitored and displayed to modify the welding conditions in accordance with the monitored condition to control the automatic pipe welder.

8 Claims, 14 Drawing Figures

| ADDRES | CONTENTS | 96 |
|---|---|---|
| A | PIPE DIAMETER | |
| A+1 | WELDING CURRENT $I_{11}$ (LAYER #1, 1 O'CLOCK) | ⎫ |
| A+2 | DRIVE SPEED $S_{11}$ (LAYER #1, 1 O'CLOK) | ⎪ |
| A+3 | WELDING CURRENT $I_{13}$ (LAYER #1, 3 O'CLOCK) | ⎬ SIX POSITIONS ON PIPE |
| A+4 | DRIVE SPEED $S_{13}$ (LAYER #1, 3 O'CLOK) | ⎭ |
| ⋮ | ⋮ | |
| A+13 | WEAVING SPEED $W_2$ (LAYER #2) | |
| A+14 | WELDING CURRENT $I_{21}$ (LAYER #2, 1 O'CLOCK) | |
| A+15 | DRIVE SPEED $S_{21}$ (LAYER #2, 1 O'CLOCK) | |
| A+16 | WIRE SPEED $F_{21}$ (LAYER #2, 1 O'CLOCK) | |
| A+17 | WELDING CURRENT $I_{23}$ (LAYER #2, 3 O'CLOCK) | |
| A+18 | DRIVE SPEED $S_{23}$ (LAYER #2, 3 O'CLOCK) | |
| A+19 | WIRE SPEED $F_{23}$ (LAYER #2, 3 O'CLOCK) | |
| | ⋮ | |

| ADRRESS | CONTENTS | 97 |
|---|---|---|
| B | BEAD CENTER POSITION $x_{C1}$ (1 O'CLOCK) | |
| B+1 | BEAD WIDTH $W_1$ (1 O'CLOCK) | |
| B+2 | BEAD HEIGHT $H_1$ (1 O'CLOCK) | |
| B+3 | BEAD CENTER POSITION $x_{C3}$ (3 O'CLOCK) | |
| B+4 | BEAD WIDTH $W_3$ (3 O'CLOCK) | |
| ⋮ | ⋮ | |
| B+17 | | |

METHOD FOR CONTROLLING AN AUTOMATIC PIPE WELDER

LIST OF PRIOR ART REFERENCES (37 CRF 1.56 (a))

The following references are cited to show the state of the art:

U.S. Pat. No. 3,266,700, H. C. Bauer & et al., Aug. 16, 1966, 223-5

U.S. Pat. No. 3,266,701, H. J. Peignen, Aug. 16, 1966, 228-27

U.S. Pat. No. 3,373,914, W. A. Wall, Jr., Mar. 19, 1968, 228-8

BACKGROUND OF THE INVENTION

1. Field of the Invention

The present invention relates to a method for controlling an automatic welder, particularly a welder which requires remotely monitored control because welding operation is carried out under an adverse environment under which an operator cannot stay for an extended time period for welding.

According to the present invention, welding conditions for butt welding pipes are stored in a memory of a computer, and a joint geometry or groove shape in actual welding is sensed by a groove shape sensor. From the stored signal and the sensed signal, the computer produces an optimum welding command signal to control welding. On the other hand, the welder is provided with a visual device for monitoring an arc condition during welding and a melting condition of metals to remotely monitor the results. The welding conditions are altered or modified in accordance with the displayed monitor result in order to control the pipe welder.

2. Description of the Prior Art

Heretofore, welding has been effected while an operator approaches a welding spot. However, the welding is sometimes effected in a bad environment under which the operator cannot stay for an extended time period. A typical example is welding of pipes in a housing of a nuclear reactor. In such an environment, taking the influence to human beings body into consideration, the welding operation should be carried out while operators take turns in a short period. This is inefficient work and requires a number of operators. Among others, this is not desirable from the standpoint of the protection of the human beings body.

On the other hand, even under such environment, the requirement for higher quality of tube welding is becoming severer and severer. To meet this requirement, various automatic welders have been developed in which welding conditions have been previously set and the welding operation is carried out under the fixed set conditions. These welders are not always applicable to all of the welding operations, particularly to the pipe welding. Certain automatic welders required that an operator stayed near the welder. That is, it is a semi-automatic welder which requires an operator to monitor the welding condition, although he does not perform the welding operation per se, to reestablish the welding condition in accordance with the monitored results. Accordingly, this welder still requires that the operator stays in the bad environment.

In welding pipe ends together, there exists a problem which is different than that encountered in welding plates together. That is, a big difference from the plane welding is that a welding surface is curved and a relative positional relationship between the welding surface and a welding torch may be inversed in the course of welding. In the latter case, the welding conditions must be substantially changed between the welding of the upper portion of the pipe and the welding of the lower portion. Although a method has been known in which the pipe is rotated to maintain a fixed relative positional relationship between the welding surface and the welding torch, it is not applicable to piping work where pipes are assembled while they are welded. In an actual welding work, it is essential that the pipes are kept stationary and the apparatus is moved around the pipes to effect welding. This has been a problem in the automatic tube welding and has been one of causes to block the automation.

An automatic pipe welder which is similar to that of the present invention is disclosed in, for example, the U.S. Pat. No. 3,266,701 issued on Aug. 16, 1966, entitled "Circumferential Pipe Welding Apparatus". It relates to the apparatus to weld pipe ends together in a pipe line or the like, in which welding is carried out while torch is moved in a zig-zag fashion along a groove defined by chamfered end surfaces of abutted pipes, in order to connect two pipes together. Namely, a brace 1 having a link 2 coupled thereto is wound around a pipe 5 and an enlargement 57 at an end of a finger 56 attached to the brace is inserted in a groove 74 defined by butted pipes for positioning the brace. Rollers 7 attached to a pair of yokes 6 which are pivoted to a motor 9 hold the brace. As a motor 34 rotates, an eccentric 32 swing a crank arm 31 to swing an arm 24 around a fulcrum 71 so that a slide member 21 coupled by a pin 29 reciprocates to cause zig-zag motion. In this manner, rollers 7a and 7b which mesh with a pinion 8a of the motor are driven while the torch is swung so that the apparatus is moved around the pipe to weld the seam.

Similarly, the U.S. Pat. No. 3,266,700, issued on Aug. 16, 1966, entitled "Pipeline Welding Assembly" shows a butt welding apparatus in a pipeline. In this patent, centering means mounted on a base which is supported at an end of a mobile carriage which moves along an outer periphery at an end of a pipe, and positioning means are used to precisely position a member to be welded which is also mounted on the same base, so that welding is performed automatically along the periphery while an end of other pipe to be butted is kept at a fixed space.

Further, the U.S. Pat. No. 3,373,914, issued on Mar. 19, 1968, entitled "Automatic Welding Speed Controller" shows an example of a controller which controls welding speed for plane welding as well as curved surface welding. This patent relates to an apparatus which automatically controls the welding speed of the welding torch. In order to assure that the welding torch is moved at a constant speed along a plane welding line as well as a curved welding line, a speed detector which is moved with the welding torch is provided to detect actual running speed of the welding torch to provide an error signal relative to a given speed, which error signal is applied to a drive motor for the welding torch to control the same so that the running speed of the welding torch is automatically adjusted to the given speed.

The prior art apparatus disclosed in those patents, however, merely show automatic or semiautomatic welders for pipeline or apparatus for effecting welding along welding line on a plane or curved surface, and they do not discuss the problem relating to remote control of reliable welding in the environment under which an operator cannot stay for an extended time period.

In this sense, the method for remotely monitoring and controlling the automatic tube welder according to the present invention is quite novel.

SUMMARY OF THE INVENTION

It is an object of the present invention to previously store welding conditions and produce a current optimum welding control command signal from the stored welding conditions and an actual groove shape signal, for controlling the welder.

It is another object of the present invention to alter or modify the welding conditions from a remote station in accordance with an arc condition at a welding spot and a melting condition of a metal.

According to the present invention, in order to attain the above objects, the welding conditions are previously stored in a memory of a computer, and a groove shape sensor is mounted in the welder. Thus, the computer produces the optimum welding control command signal from the sensed groove shape signal and the stored welding condition signals for controlling the welder.

Another feature of the present invention lies in that a visual device for monitoring the arc condition and the metal melting condition at the welding spot during the actual welding is provided, and an output signal from the visual device is transmitted to a safe location remote from the welding spot to display the conditions so that the welding conditions stored in the computer are altered or modified in accordance with the displayed conditions.

A still further feature of the present invention lies in that a groove shape is detected when the welding started from a reference point has been completed around the entire periphery and returned to the reference point, and the sensed groove shape is applied to the welding of the next layer in a multi-layer welding so that the torch is positioned more precisely to attain more accurate welding.

Yet another feature of the present invention lies in that the torch position on the periphery of the pipe is sensed and when it reaches a predetermined position the welding conditions are automatically altered.

BRIEF DESCRIPTION OF THE DRAWINGS

FIG. 4 shows a block diagram of one embodiment of a welder controlling apparatus, in which

FIG. 11 illustrates the movement of the sensor on a beveling in which FIG. 11(a) illustrates the movement and FIG. 11(b) shows an example of groove shape sensed by the sensor having the characteristic shown in FIG. 10;

FIG. 13 illustrates displayed images on the display monitor of FIG. 5, in which FIG. 13(a) shows positional relationship between the groove shape and the torch, and FIG. 13(b) shows an example of displayed image corresponding to FIG. 13(a).

DESCRIPTION OF THE PREFERRED EMBODIMENTS

The present invention is intended to overcome the drawbacks encountered in the prior art apparatus, and it produces an optimum welding control command signal from the previously stored welding conditions and the actual beveling condition or arc condition for remotely control the welder.

First, outline of welding operation carried out using the welder is described. Welding conditions for each layer and each piping position are stored in a memory from a control panel. Then, a welding power supply and various drive mechanisms are actuated in accordance with the stored welding conditions so that welding proceeds while the welding torch is moved circumferentially on the pipe. The welding conditions are displayed by a vidicon camera on a monitor screen of a display panel. An operator at a remote station finely adjusts the welding conditions while he observes the displayed conditions. The change of the welding conditions corresponding to the welding position of the pipe is carried out by reading out the content previously stored, at a predetermined position and automatically establishing the conditions. The welding operation continues in this manner, and when the welder completes one revolution the welding operation is stopped and the welder is moved backward to the original position. In the return movement, a sensor mechanism is operated to sense the groove shape. The sensed shape is stored in the memory. Based on this sensed groove shape, positioning of the torch for the next welding layer is effected. The welder is again moved forward from the original point to weld the next layer. Thus, welding is carried out during the forward movement and the groove shape is sensed during the backward movement, and the sensed result is applied to the following welding in the forward movement. The above steps are repeated to carry out the multi-layer welding.

After the completion of welding, the welding unit is replaced by a grinding unit to grind the welded portion. To this end, the welding control apparatus is set to a grinding mode to set the grinding condition from the memory. The grinding unit is moved in accordance with the setting to grind the welded portion. During the forward movement of the grinding unit, it grinds the welded portion, and during the backward movement the sense mechanism senses the shape of the grinded surface. The sensed shape is recorded in a recorder or the like and if it is determined that the resulting shape is not proper, regrinding operation is carried out.

After the completion of the grinding operation, the grinding unit is taken off and the welded portion is tested by a ultrasonic fault detection unit.

In this specification, automatic welding is described in detail.

Figure 1:
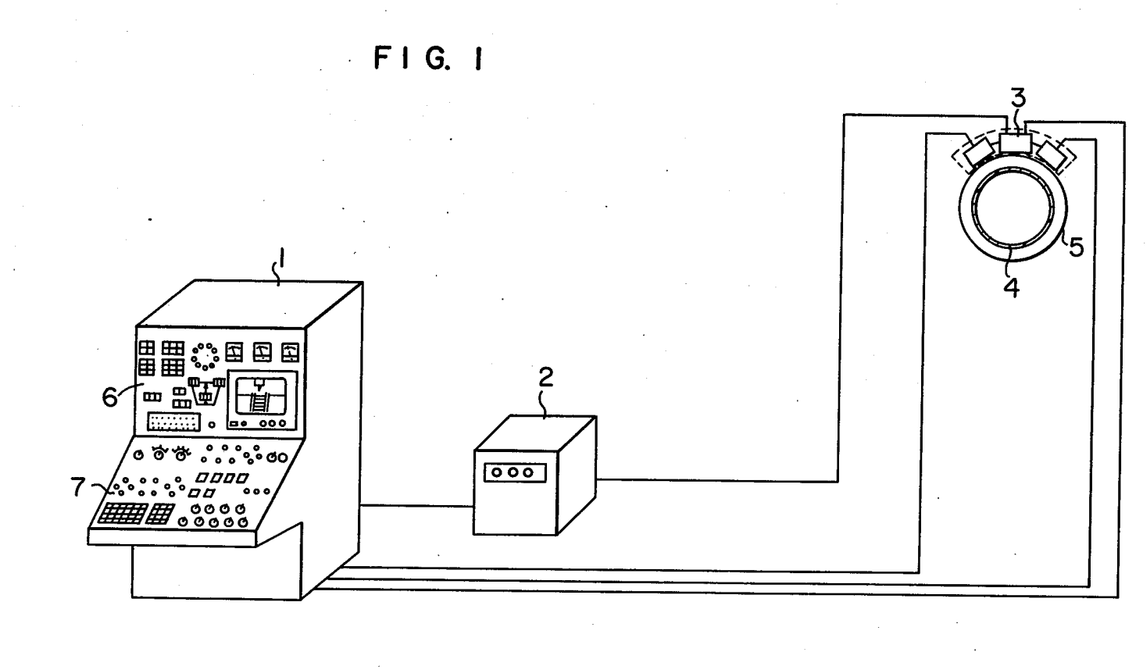
FIG. 1 shows an external view of a welder body for illustrating method for controlling the welder.

The present invention is now explained with reference to the preferred embodiments thereof. FIG. 1 shows an overall configuration illustrating one embodiment of a pipe welder using a welder control apparatus of the present invention, which comprises the welder control apparatus 1 of the present invention, a welding power supply 2, a welder unit 3, a pipe 4 and a guide rail 5 for mounting the welder unit 3 on the pipe 4. In the configuration of FIG. 1, welding is carried out while the remotely located welder unit 3 is moved on the pipe 4 through the guide rail 5 under the conditions controlled by the control apparatus 1. The welding conditions are displayed on a display panel 6 of the control apparatus 1, and an operator, while observing the displayed conditions, adjusts dials on a control panel 7 of the control apparatus 1 to modify the welding conditions. Through this operation, the welder unit 3 can be remotely controlled by the control apparatus 1. The welding control apparatus 1 of the present invention is now described in detail in conjunction with the explanation of the embodiments of the respective sections.

Figure 2:
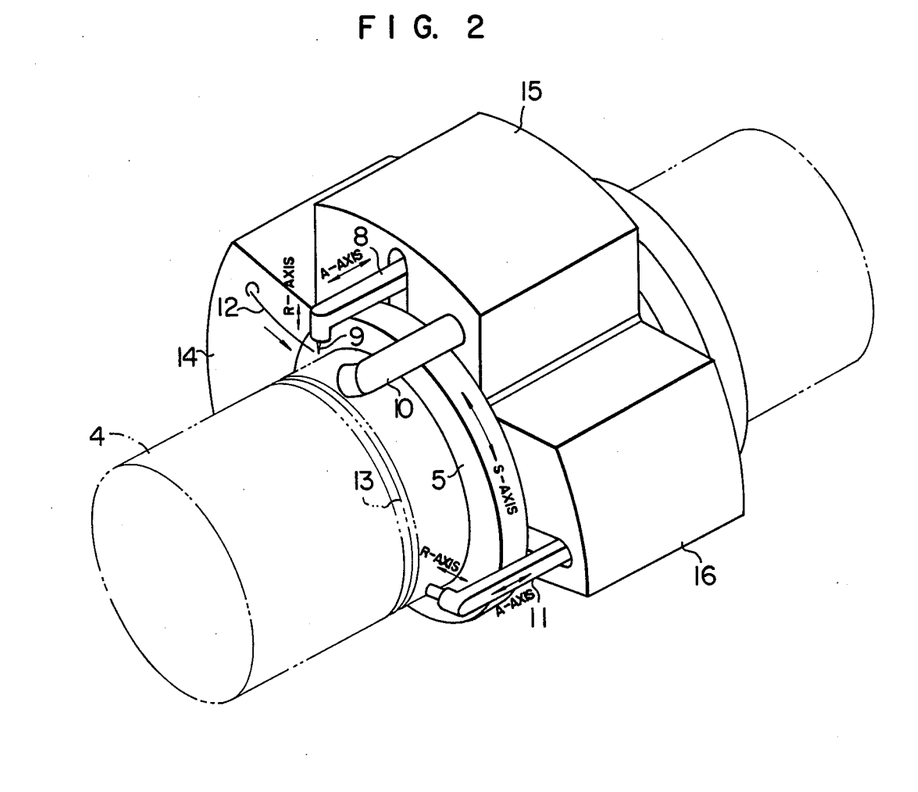
FIG. 2 shows the welder body of FIG. 1 mounted on a pipe.
Figure 3:
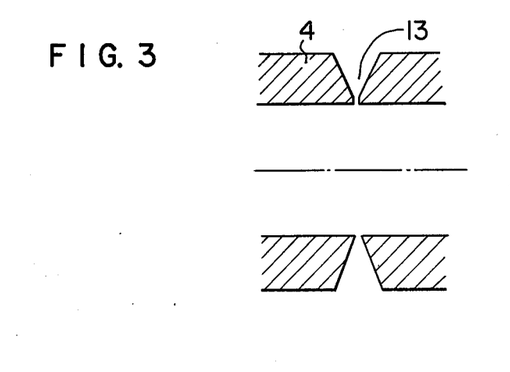
FIG. 3 shows butted sections of pipes to be welded together, that is, so-called groove shapes.

FIG. 2 shows one embodiment of an outer structure of the welder unit of FIG. 1, and shows a welder for welding the pipes 4 which are materials to be welded. Numeral 8 denotes a welding torch which is constructed to be movable along an A-axis which is parallel with the pipe 4 as shown in FIG. 1 and along an R-axis which is perpendicular to the pipe 4. Although not shown, a wire from a power supply for supplying a current to an electrode 9 is connected to an end of the torch 8. Numeral 10 denotes a viewing unit for monitoring the welding condition such as bead shapes during welding, and it is provided with a mechanism to allow manual positioning thereof to a position to monitor the arc condition during welding. Numeral 11 denotes a groove shape sensor which produces a voltage proportional to the distance from the end of the sensor to the material to be welded. Like the welding torch 8, the groove shape sensor 11 is constructed to be movable along the A-axis which is parallel to the pipe 4 and along the R-axis which is perpendicular to the pipe 4. Numeral 12 denotes a welding wire which is fed to the electrode area at a substantially constant rate. Numeral 13 denotes a beveling having a section as shown in FIG. 3. Numeral 5 denotes a guide rail which is movable circumferentially (S-axis direction) of the pipe by a drive mechanism in a drive unit 14. A welding unit 15 including the drive mechanism for the welding torch 8 and the drive mechanism for the viewing unit 10, and a sensing unit 16 including the groove shape sensor 11 and the drive mechanism therefor are movable circumferentially along the guide rail 5 by a movable carriage in the drive unit 14.

Figure 4A:
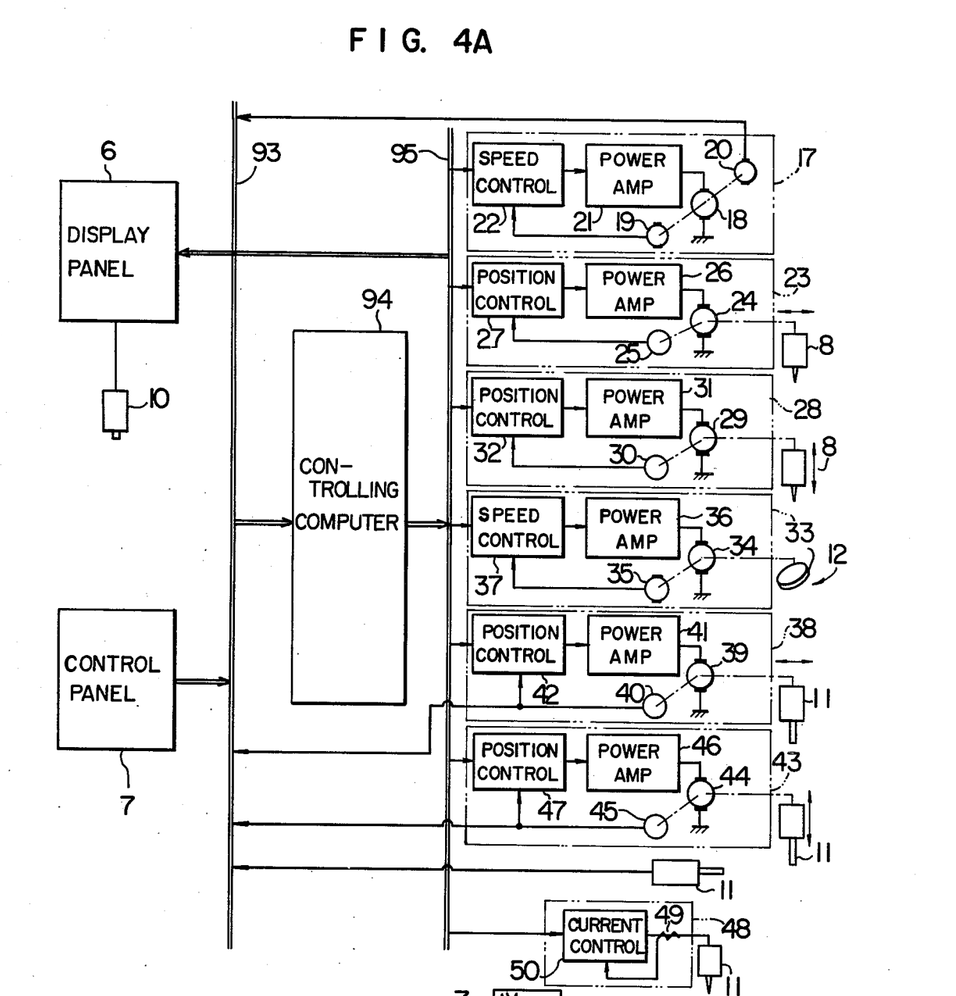
FIG. 4A shows a control unit for a main section of the welder and FIG. 4B shows a control unit for a monitor device of the welder.
Figure 4B:
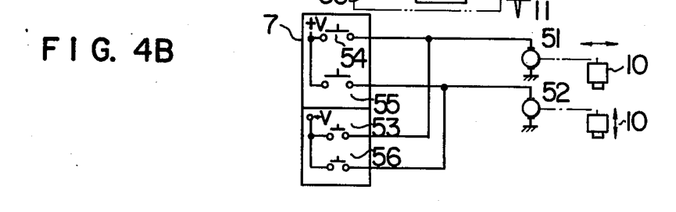
Figure 5:
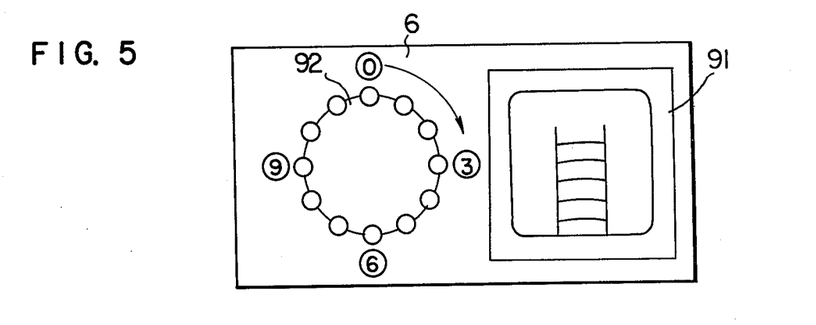
FIG. 5 shows an external view of one embodiment a display panel shown in FIG. 1.
Figure 6:
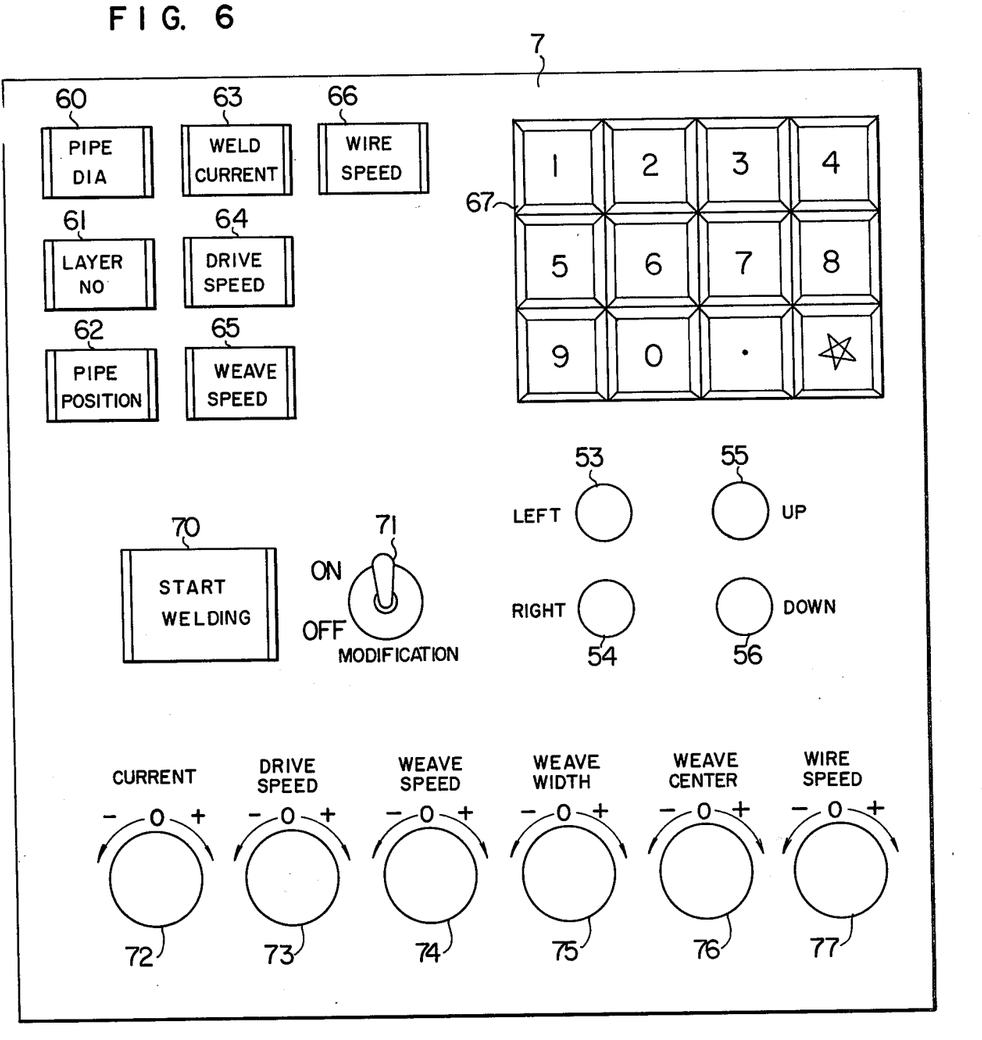
FIG. 6 shows an external view of one embodiment of a control panel shown in FIG. 1.

FIG. 4 is a block diagram of one embodiment of the welder control apparatus 1 of the present invention shown in FIG. 1. In FIG. 4A, numeral 6 denotes the display panel for displaying the welding conditions, and as shown in FIG. 5 it comprises a visual monitor 91 which mainly consists of a CRT for displaying the output of the viewing unit 10 and an attitude display device 92 which consists of 12 lamps for indicating the attitudes of the torch relative to the pipe. Symbols ⓪,③,⑥ and ⑨ correspond to dial of a clock. Numeral 7 denotes the control pannel which enters the welding conditions and produces a start signal for starting the welding and signals for modifying the welding conditions during welding, and as shown in FIG. 6 it comprises keyboard switches 60 to 66 marked with condition designations, a keyboard switch 67 marked with numerals, decimal point and * symbol, a switch 70 for indicating the start of welding, a switch 71 for determining whether modification operation is required to partially modify the conditions, switches 53 to 56 for adjusting relative position of the viewing unit 10 relative to the welding torch 8, and potentiometers 72 to 77 for partially modifying the conditions. The keyboard switch 60 is used to enter the pipe diameter, the keyboard switch 61 is used to enter the layer number, the keyboard switch 62 is used to enter the pipe position, the keyboard switch 63 is used to enter the welding current, the keyboard switch 64 is used to enter the drive speed, the keyboard switch 65 is used to enter the weaving speed and the keyboard switch 66 is used to enter the feeding speed of the welding wire.

The potentiometer 72 for finely adjusting the welding conditions adjusts the welding current, the potentiometer 73 adjusts the drive speed, the potentiometer 74 adjusts the weaving speed, the potentiometer 75 adjusts the weaving width, the potentiometer 76 adjusts the center weaving position, and the potentiometer 77 adjusts the feeding speed of the welding wire. The control method therefor will be described later.

Numeral 93 denotes an input line for supplying signals to a computer 94, numeral 95 denotes an output line for supplying signals from the computer 94 to respective elements, and numeral 17 denotes a drive circuit for driving the carriage which drives the drive unit 14, the welding unit 15 and the sensing unit 16 along the guide rail 5, and it comprises a motor 18, a tacho-generator 19, a potentiometer 20, a power amplifier 21 and a speed control circuit 22. Numeral 23 denotes a torch A-axis drive circuit for controlling the A-axis position of the welding torch 8, and it comprises a motor 24, a potentiometer 25, a power amplifier 26 and a position control circuit 27. Numeral 28 denotes a torch R-axis drive circuit for controlling the R-axis position of the welding torch 8, and it comprises a motor 29, a potentiometer 30, a power amplifier 31 and a position control circuit 32. Numeral 33 denotes a wire drive circuit for controlling the feeding speed of the welding wire 12, and it comprises a motor 34, a tacho-generator 35, a power amplifier 36 and a speed control circuit 37. Numeral 38 denotes a sensor A-axis drive circuit for controlling the A-axis position of the groove shape sensor 11, and it comprises a motor 39, a potentiometer 40, a power amplifier 41 and a position control circuit 42. Numeral 43 denotes a sensor R-axis drive circuit for controlling the R-axis position of the groove shape sensor 11, and it comprises a motor 44, a potentiometer 45, a power amplifier 46 and a position control circuit 47. The output of the groove shape sensor 11 and the R-axis and A-axis position are entered to the computer 94 via the input line 93. Numeral 48 denotes a power supply circuit for supplying a current to the electrode 9 of the welding torch, and it comprises a current sensor 49 and a current control circuit 50. In FIG. 4B, numerals 51 and 52 denote motors for moving the A-axis and R-axis positions of the viewing unit 10, and they are actuated by depressing the switches 53, 54, 55 and 56 on the control panel 7 for applying voltages.

Figure 7:
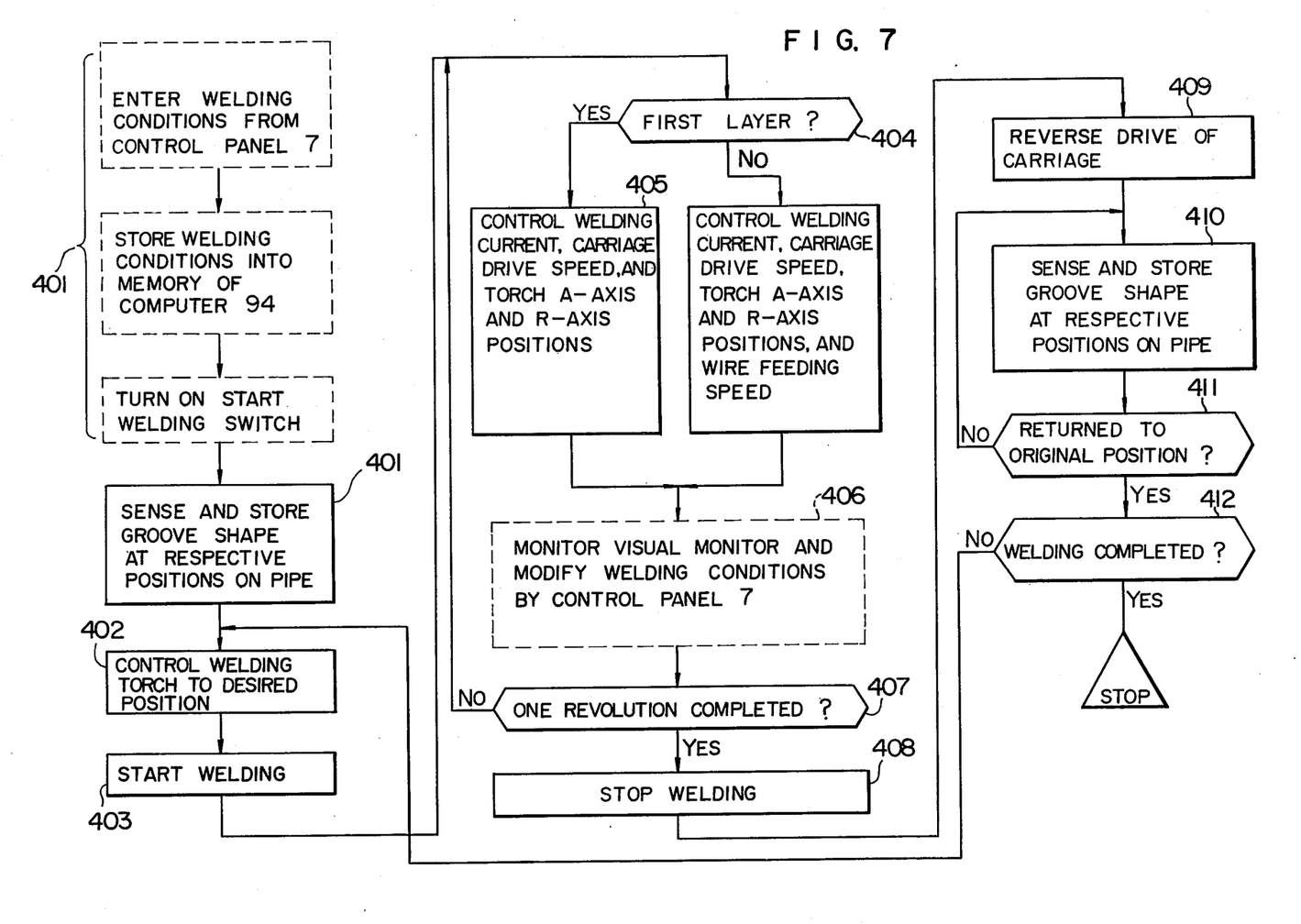
FIG. 7 shows a flow chart of processing by a computer.
Figure 8:
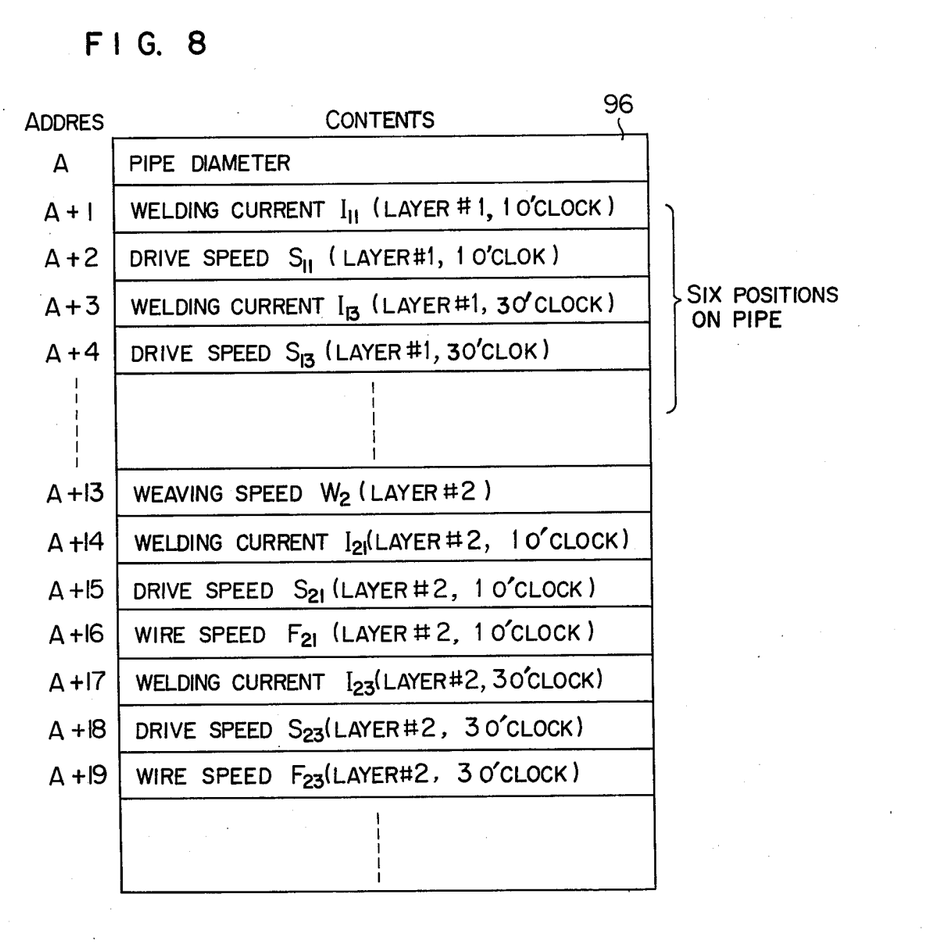
FIG. 8 shows an example of content stored in a memory.
Figure 9:
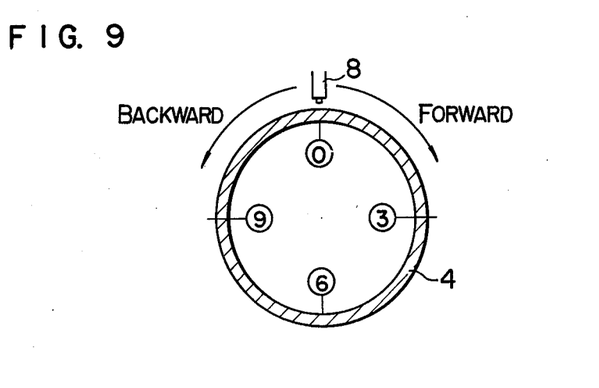
FIG. 9 shows an example of position indication on a pipe related to forward-backward movement of welding torch and a clock dial.
Figure 11:
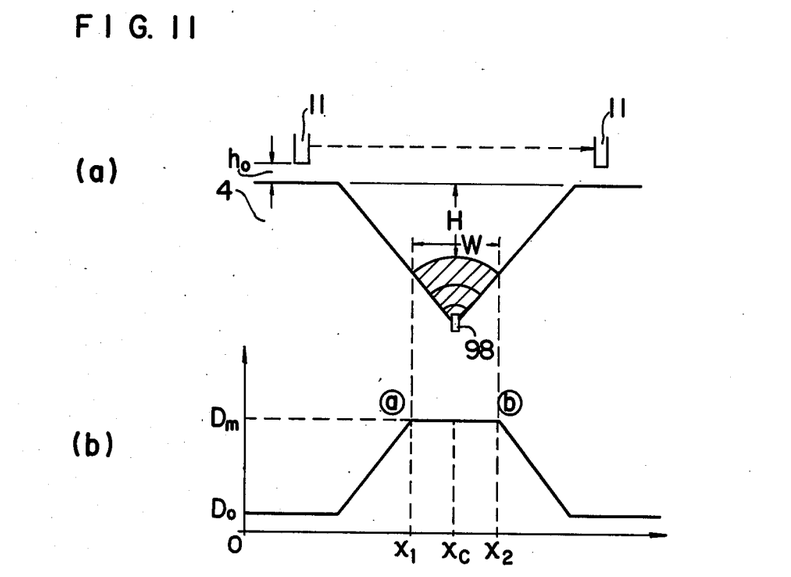

The operations of FIGS. 1 to 6 are now explained in conjunction with the multi-layer welding of the pipe. Welding of the first layer is carried out by straight bead while inserting an insert link, and the second and subsequent layers are welded by feeding the welding wire while weaving the welding torch. FIG. 7 shows a operation flow chart of the welder and the control apparatus shown in FIGS. 1 to 6. Operations encircled by broken lines are carried out by an operator while the remaining operations are automatically controlled by the control apparatus. The operations of FIGS. 1 to 6 are now explained with reference to FIG. 7. At step 401, the operator enters the welding conditions from the control panel 7. As shown in FIG. 6, the control panel 7 may comprise the self-illuminated keyboard switches 60, 61, 62, 63, 64, 65 and 66 marked with condition designations, the keyboard switch 67 marked with numerals and an interface circuit, not shown, for connecting the electrical signals from those switches to the input line 93 of the computer 94. The entry of the welding conditions from the control panel 7 of FIG. 6 is explained. When the self-illuminated keyboard switch 60 is depressed, the entry of the data on the pipe diameter is informed to the computer 94 via the input line 93. Next, the board "8" of the keyboard switch 67 and the board "*" are depressed so that the data of "8" pipe diameter is stored at a predetermined area A of the memory 96 of the computer 94, as shown in FIG. 8. When the self-illuminated keyboard switch 61, the board "2" of the keyboard switch 67 and the board "*" are depressed, the layer #2 is specified, and when the self-illuminated keyboard switch 62, the board "3" of the keyboard switch 67 and the board "*" are depressed, the "three o'clock" position is specified, and when the self-illuminated keyboard switch 63 and the boards "2", "5", "0" and "*" of the keyboard switch 67 are depressed sequentially, a welding current of 250A at the pipe position ③ (three o'clock) of the layer #2 is set. That is, in FIG. 8, numeral 250 is stored at the address A+17 of the memory 96. In a similar manner, the welding conditions are stored at predetermined areas of the memory of the computer 94. Then, when the start welding switch 70 on the control panel 7 is turned on, the automatic welding is started. At the step 401, the carriage drive circuit 17 is actuated by the computer 94 to rotate the units in the direction shown in FIG. 9. The output of the potentiometer 20 in the carriage drive circuit 17 is entered to the computer 94 to determine the position on the pipe to turn on a given lamp of the attitude indication device 92 of the display panel 6 and stop the unit at a given position. At that position, the sensor A-axis drive circuit 38 and the sensor R-axis drive circuit 43 are operated as shown in FIG. 11 and the outputs of the potentiometers 40 and 45 and the output of the groove shape sensor 11 are entered to the computer 94. From those outputs, the bead height H, the bead width W and the bead center position $x_c$ are calculated and stored in the memory.

Figure 10:
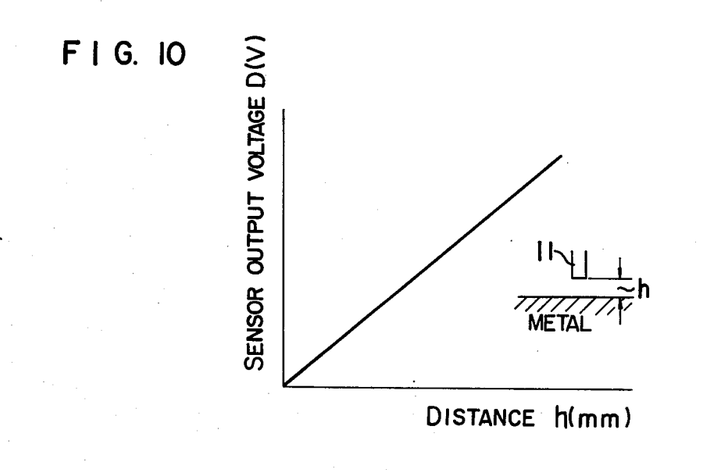
FIG. 10 shows an example of sensing characteristic of a groove shape sensor.
Figure 12:
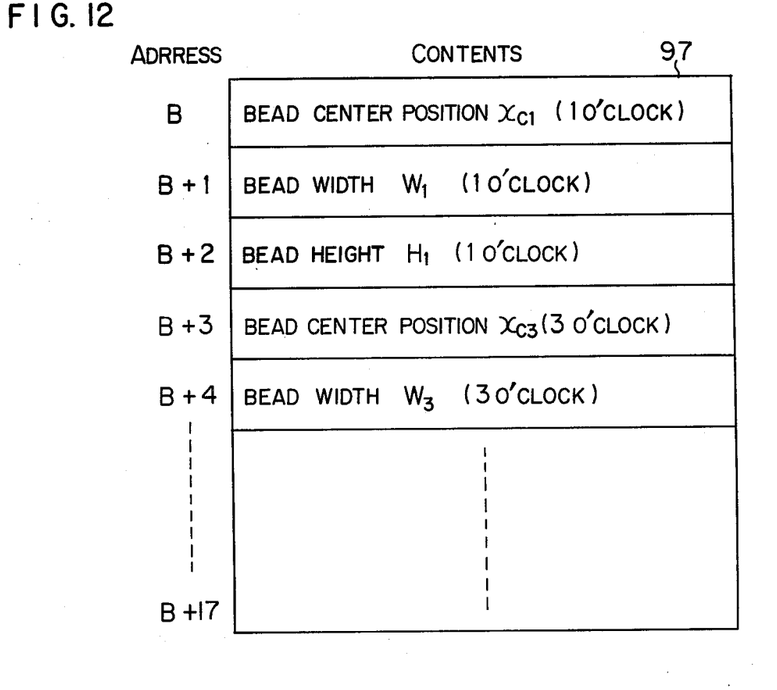
FIG. 12 shows a content stored in the memory.

The groove shape sensor 11 comprises an oscillation coil which is excited by a high frequency current, and differentially wound sensing coils, and senses the change in magnetic flux due to the change in distance between the sensor 11 and the metal for measuring the distance between the sensor 11 and the metal. It exhibits a characteristic as shown in FIG. 10, together with the sensing circuit. Thus, when the sensor 11 is moved at a fixed distance $h_o$ above the pipe 4 as shown in FIG. 11(a), the sensor 11 produces the output as shown in FIG. 11(b). The computer 94 receives the output of the potentiometer 40 and the output of the sensor 11, and it detects a potentiometer output $x_1$ at a point ⓐ where the output of the sensor 11 is flat and a potentiometer output $x_2$ at a point ⓑ where the output of the sensor 11 starts to change, and calculates a bead center position $x_c = (x_1 + x_2)/2$, which is stored at an address B of the memory 97 shown in FIG. 12. It also calculates a bead width $W = x_2 - x_1$, which is stored at an address B+1 of the memory 97. Further, it calculates a bead height $H = D_m - D_o$, which is stored at an address B+2.

The above groove shape sensing operation is carried out at several points and the sensed data are stored. After the completion of one revolution, the carriage drive circuit 17 is operated to drive the unit backward to the original position (step 401'). When the return operation is completed, the motor 18 for driving the carriage is stopped and the torch A-axis drive circuit 23 and the torch R-axis drive circuit 28 are actuated to position the welding torch 8 at the center of the beveling and at a given distance above the bead. The positioning command for this positioning operation is generated from the computer 94 based on the bead width W and the bead height H which have been sensed by the groove shape sensor 11 and stored in the memory 97 of the computer 94. In this manner, when the positioning of the welding torch 8 has been completed at the step 402, an arc is generated, and the start welding switch 70 on the control panel 7 is depressed at the step 403 to start the welding operation. At the step 404, it is determined whether the layer is the first layer or not, and if the first layer welding is determined, the carriage drive circuit 17 is actuated at the step 405 to drive the carriage circumferentially for melting the insert link 98 as seen from the sectional view of the beveling shown in FIG. 11. At the same time, the welding current is controlled by the power supply circuit 48, the vertical position of the welding torch 42 is controlled by the torch A-axis drive circuit 23 and the horizontal position of the welding torch is controlled by the torch A-axis drive circuit 23. The viewing unit 10 is positioned at a position which allows that an operator can observe the welding condition by operating the switches 53 to 56 of the control panel 7 while the operator is observing the visual monitor 91 when the welding has started. Little adjustment is required thereafter because the viewing unit 10 moves integrally with the welding unit 15. Under those conditions, the welder moves on the pipe, and the welding conditions at respective points on the pipe which have been previously stored in the memories 96 and 97 of the computer 94 are commanded from the computer 94 so that the welding operation is carried out under the control of the respective drive circuits. In such automatic welding, if the preset welding conditions are not proper, or the precision of the groove shape sensor 11 is poor or thermal deformation of the groove shape is included, the optimum welding is not always attained. According to the present invention, the step 406 is provided wherein the welding conditions are displayed by the visual monitor 91 through the viewing device 10 in the welding unit 15 to enable the modification of the welding conditions by the control panel 7.

Figure 13:
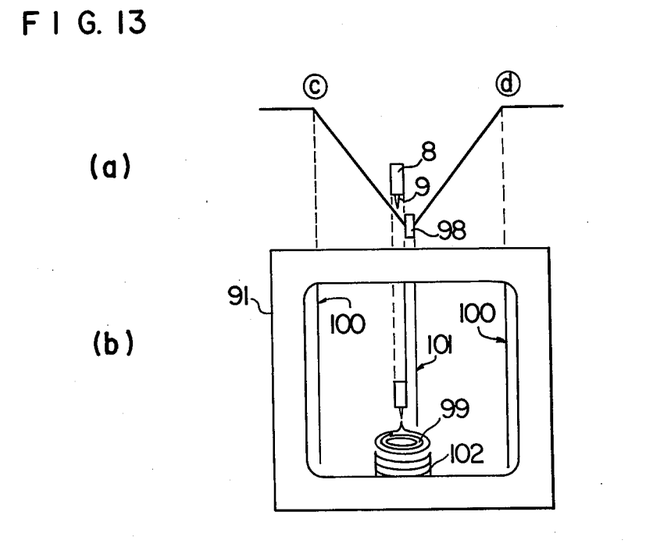

For example, as shown in FIG. 13(a), when the welding torch 8 and the electrode 9 are positioned to the insert link 98 for the first layer welding, an image as shown in FIG. 13(b) is displayed on the visual monitor 91. That is, corners ⓒ and ⓓ of the beveling are displayed as dark-bright border lines 100 on the visual monitor 91. The insert link 98 is displayed as a different brightness area 101. The condition in which the arc is occurring and the metal is being molten is displayed by 99 and a welded area is displayed by 102. From the image of the visual monitor 91, it is determined that the welding torch 8 is offset to the left relative to the insert link 98. As a result, at the step 406, the operator changes the welding conditions from the control panel. That is, the modification switch 71 on the control panel 7 shown in FIG. 6 is turned on and the potentiometer 76 for the weaving center position is turned rightward. Through this operation, the welding torch 8 is moved rightward in FIG. 13(a) so that it melts the insert link 98 at a correct position.

In this manner, since the fine adjustment of the welding conditions can be carried out by the operator while he is observing the visual monitor 91, high quality welding can be attained through the remote control without requiring that the operator stays near the welder.

When the welder completes one revolution around the pipe (step 407), the welding operation is stopped (step 408) and the motion of the carriage is also stopped. Under this condition, the carriage drive circuit 17 is actuated to move the carriage in the reverse direction to that in FIG. 9 (step 409). The carriage is stopped at a predetermined position on the pipe, and the sensor A-axis drive circuit 38 and the sensor R-axis drive circuit 42 are actuated as shown in FIG. 11 so that the bead width and the bead height are stored in the memory 97 of the computer 94 in a similar manner as described above (step 410). When the welder returns to the original point (step 411), it is determined whether further welding is or is not required (step 412), and if the further welding is required, the welding torch is positioned at the center of the beveling at a given distance above the bead surface and the welding operation is re-started. In the welding for second and subsequent layers, the speed control for the welding wire and the weaving control by the torch A-axis drive circuit are added to the control operations for the first layer, as shown in the step 413. Namely, by the additional weaving control, a speed command is issued from the computer 94 to the wire drive circuit 33 to feed the welding wire to the electrode 9 of the welding torch 8, and a position command of a constant width pedestal shape is issued to the torch A-axis drive circuit 23 to weave the welding torch 8 at a constant width and a constant speed. To this end, the condition modifying potentiometers on the control panel 7 are provided for adjusting weaving speed, weaving width, weaving center position and wire feeding speed, all of which can be modified while the operator is observing the visual monitor 91.

One embodiment of the remote-controlled automatic welder control apparatus has been described. The present embodiment has the following advantages: (i) Since the computer is used as a cordinating control system, the welding conditions and the groove shape can be readily stored and proper commands to the drive circuits and the power supply circuit can be issued. (ii) Since a series of operation can be instructed by a program of the computer, the apparatus can be readily applicable to different object to be welded. (iii) Since the groove shape is sensed for each of the layers to position the welding torch, high precision and high quality welding is attained. (iv) Since the welding conditions can be modified by the operator while he is observing the visual monitor, higher quality welding is attained. Further, when the control panel including the visual monitor is displaced remotely from the welder unit, remote control is attained.

While the preferred embodiment of the present invention has been explained in conjunction with the welding of pipes, it should be understood that the control apparatus of the present invention can be applicable to other welding operation where the welder unit is provided with one or more drive mechanisms to control the positional relation of the welding torch to the material to be welded, the viewing unit for monitoring the welding conditions and the groove shape sensor for sensing the groove shapes before and after welding.

According to the present invention, since the computer is used as the cordinating control system and the welding operation is carried out under the control by the output signal of the groove shape sensor, high precision welding operation can be attained. Furthermore, since the operator can continuously observe the welding conditions through the visual monitor to remotely modify the welding conditions, high quality welding is attained even in the application where the operator cannot stay for an extended time period.

What is claimed is:

1. Method for remotely controlling an automatic welder for butt-welding pipes, comprising the steps of:
   (a) storing into a memory, welding conditions in a plurality of regions distributed on a periphery of the pipe;
   (b) sensing the position of a welding torch on the periphery of the pipe, reading out the welding conditions stored in said memory at the welding condition modifying points and continuing the welding operation in accordance with the welding conditions read out;
   (c) stopping the welding operation after the completion of one revolution of welding and returning the welding torch to an initial point;
   (d) actuating a groove shape sensor during the step (c) to sense groove shape; and
   (e) positioning said welding torch for effecting welding of the next layer in accordance with the groove shape sensed in the step (d) and repeating above steps in accordance with welding conditions for the next layer stored in the memory thereby effecting multi-layer welding.

2. Method for remotely controlling an automatic welder according to claim 1, wherein, in said step (d), the groove shape is sensed at a plurality of predetermined points on the periphery of the pipe.

3. Method for remotely controlling an automatic welder according to claim 1, wherein, in said step (b), the periphery of the pipe is divided into four regions at 90° intervals with a topmost point on the periphery of the pipe being a reference point, the welding conditions for the respective regions are stored, and the welding conditions are sequentially modified at the boundary between the regions as the welding condition modifying points.

4. Method for remotely controlling an automatic welder according to claim 1, wherein the position of said welding torch on the pipe is displayed on a circular display unit corresponding to a cross-section of the pipe.

5. Method for remotely controlling an automatic welder according to claim 4, wherein a plurality of lamps are arranged in a circle and that one of said lamps which corresponds to the position of the welding torch is turned on to indicate the position of the welding torch.

6. Method for remotely controlling an automatic welder according to claim 1, wherein, in said step (a), welding currents for respective layers of a given pipe diameter, welding torch drive speed, weaving speed and welding wire feeding speed are stored for each of the plurality of divided regions on the periphery of the pipe, as said welding conditions.

7. Method for remotely controlling an automatic welder according to claim 1, wherein welding status is picked up by a vidicon camera mounted on a welding unit to display the status on a display unit of a remote control apparatus.

8. Method for remotely controlling an automatic welder according to claim 7, wherein the welding conditions are modified in accordance with the welding status displayed on said display unit so that the subsequent welding operation is carried out under the modified welding conditions.

* * * * *